W. H. GRAHAM.
Stop-Cock Boxings.

No. 143,978.   Patented Oct. 28, 1873.

Witnesses:
Chas. Meisner
J. W. Berthel

Inventor:
William H. Graham
per Berthel & Co
his Attys

UNITED STATES PATENT OFFICE.

WILLIAM H. GRAHAM, OF ST. LOUIS, MISSOURI.

IMPROVEMENT IN STOP-COCK BOXINGS.

Specification forming part of Letters Patent No. 143,978, dated October 28, 1873; application filed September 22, 1873.

*To all whom it may concern:*

Be it known that I, WILLIAM H. GRAHAM, of the city and county of St. Louis and State of Missouri, have made a certain new and useful Improved Water and Gas Stop-Cock Box; and I do hereby declare that the following is a full and true description thereof, reference being had to the accompanying drawings and to the letters of reference marked thereon.

This invention relates to water, gas, or similar stop-cock boxes, casings, or housings, used to inclose the "stop-cocks" of gas, water, and similar pipes in streets, alleys, sidewalks, &c. The improvements here shown are designed to overcome certain difficulties and inconveniences hereinafter to appear, and in general to form an improved stop-cock box. The said improvements relate, first, to partly constructing the body of the stop-box of a square shape, the remainder being the ordinary round shape, and providing within the square chamber made opening and closing valves to control the interior part or chamber of said boxing; secondly, to the peculiar manner of hinging the lid, cover, or cap (that opens and closes the top of the box) to a connecting-arm, which is pivoted to one side of said box; thirdly, in providing the stop-cock box with an extension boxing, and to the peculiar manner of securing same in different positions as to height; lastly, to certain detail parts, all of which will now more fully appear.

Figure 1:
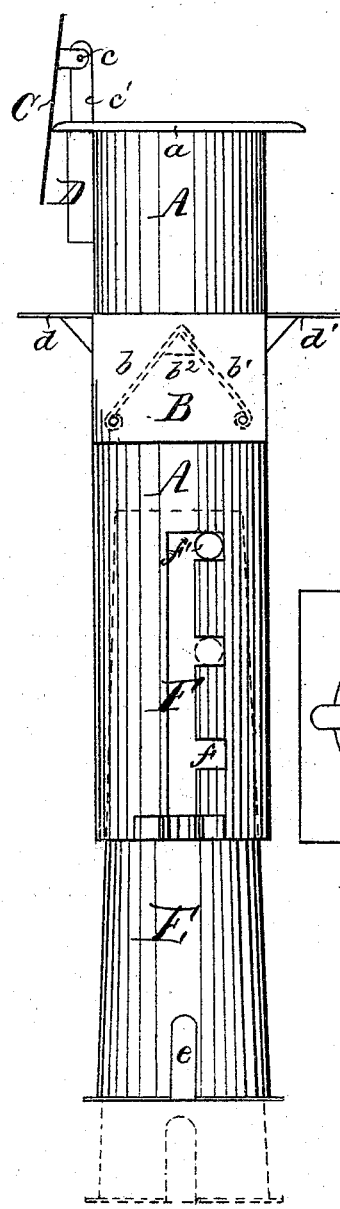
Figure 3:
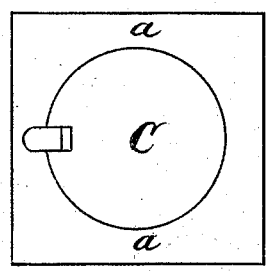
Figure 2:
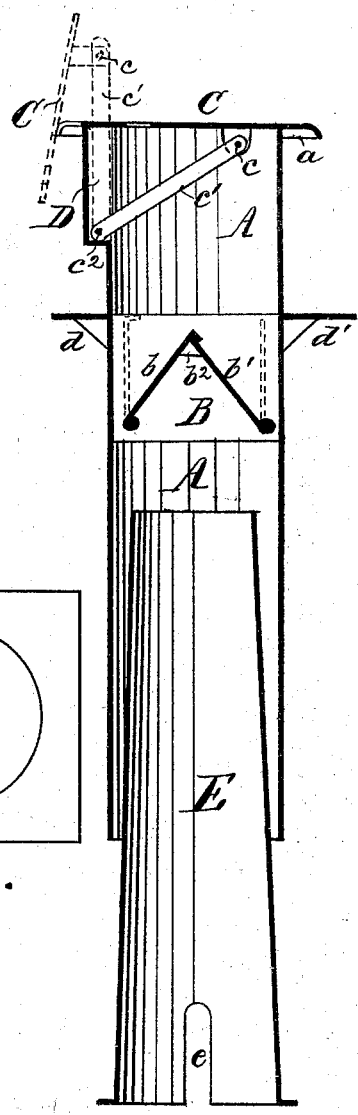

Of the drawings, Figure 1 is a side elevation. Fig. 2 is a sectional elevation. Fig. 3 is a top plan, showing cap closed.

A is the stop-cock box proper, having at its upper end a flange, $a$, in the usual manner. The constructive shape of the box A I have improved, in order to adapt the same to the important feature following: It is well known that the ordinary stop-cock boxes frequently have their interior or chamber leading to the "shut-off cock" filled or closed with dirt, stones, rubbish, and the like impediments, and that not unfrequently great difficulties are experienced to operate through said stop-cock boxes and get at the shut-off cock to open and close the same. To remedy these defects, and especially to protect the lower chamber or parts of the box, I separate or divide the top chamber or part of the box from the lower part thereof by the following contrivance: I alter the ordinary constructive shape of the box A by forming the same square in shape, as at B, Figs. 1 and 2. Within the square chamber B thus made I have arranged, at two sides thereof, two-way valves, $b$ $b^1$, Figs. 1 and 2. The valves $b$ $b^1$ have their valve-stems fitted to turn in the sides of the chamber B, and so as to open and close in the positions shown by dotted and full lines in Figs. 1 and 2. When closed, (see dotted lines Fig. 1, and full lines, Fig. 2,) the valves $b$ $b^1$ are supported on a lug or bearing, $b^2$, and when opened fall back against the sides of the chamber B. (See dotted lines, Fig. 2.) The valve $b$ can have its top edge flanged, so as to fold over the top edge of the valve $b^1$, as shown in Figs. 1 and 2. The contrivance of the valves aforesaid, when closed, protects the lower chamber of the box from undue accumulations, fillings, or impediments, can readily be opened, and thus said valve arrangement greatly facilitates the operator in getting at and operating the stop-cock.

My improvement, as relates to the cap for the boxes, is as follows: The flange $a$, top of the box, has the proper seat, so that the cap C fits flush with the top of the said flange when seated. The cap C I hinge at $c$ to one end of a connecting-arm, $c^1$. The other end of the connecting-arm $c^1$ is pivoted at $c^2$ within an offset, D, which is made and provided at one side of the box A, as shown in Figs. 1 and 2. The offset D also makes allowance for the arm $c^1$ to be out of the way of the interior part of the box when said arm with its cap C is raised upright. (See Figs. 1 and 2.) The cap C can be readily raised, as the joints $c$ $c^2$ permit the arm $c^1$ to assume the vertical position in offset D, and thus the full opening of the chamber of the box A is had. When closed, the cap C is flush with top of box A, Fig. 3, and its connecting-arm $c^1$ assumes the position shown in full lines in Fig. 2. The cap C is thus secured, so as not to be liable to loss or disarrangement; and, further, additional strength and support are added to same by its arm $c^1$, protecting said cap from the rough usage it is liable to. $d$ $d'$ are side lugs or bearings, as ordinary. In order that the box A can be adapted to different depths, I have provided and made the extension-box E. The extension-box E is rounded, but somewhat tapering, so as to fit and be placed within the lower part of the main box A. At its lower end the box E has the entrance-slots $e$, for the service-pipes to pass and connect, as usual. To secure the extension E in various positions as to depth, with relation to the top box A, I provide the same with a vertical running slot, F, having side slots $f$. (See Fig. 1.) In the slot F of the box A the lug $f'$, top of the extension-box E, is fitted to pass. To hold and secure the said box E in required position its lug $f'$ is placed in any of the side slots $f$ of the box A, as indicated in Fig. 1.

What I claim is—

1. The extension stop-cock box E, having lug $f'$, in combination with box A, having running slot F and side slots $f$, as and for the purpose set forth.

2. A stop-cock box, A, having square chamber B and valves $b$ $b^1$, as and for the purpose set forth.

3. The cap C, hinged to arm $c^1$, and offset D, in combination with stop-cock box A, as and for the purpose set forth.

4. The combination of stop-cock box A, cap C, arm $c^1$, offset D, and square chamber B, having valves $b$ $b^1$, as and for the purpose set forth.

In testimony of said invention I have hereunto set my hand.

WILLIAM H. GRAHAM.

Witnesses:
  WILLIAM W. HERTHEL,
  CHAS. F. MEISNER.